United States Patent [19]

Wong et al.

[11] 4,346,026
[45] Aug. 24, 1982

[54] NON-AGING EPOXY COMPATIBLE SIZE

[75] Inventors: Robert W. Wong, Granville; Richard M. Haines, Warsaw, both of Ohio

[73] Assignee: Owens-Corning Fiberglas Corporation, Toledo, Ohio

[21] Appl. No.: 259,132

[22] Filed: Apr. 30, 1981

[51] Int. Cl.³ ............................................... C08K 5/54
[52] U.S. Cl. .................................... 524/157; 525/103; 428/290; 428/391; 524/516; 524/563; 523/205; 523/206
[58] Field of Search .................. 260/29.6 R, 29.6 NR, 260/29.6 BE, 23 R; 525/103

[56] References Cited

U.S. PATENT DOCUMENTS 3,483,043 12/1969 Grudus, Jr. ........................... 260/41
3,652,326 3/1972 Ward ........................... 117/120 GE
3,772,870 11/1973 Wong et al. ........................... 57/140
3,817,898 6/1974 Ward ........................... 260/29.6 NR Primary Examiner—Joseph L. Schofer
Assistant Examiner—Bernard Lipman
Attorney, Agent, or Firm—Ronald C. Hudgens; Philip R. Cloutier

[57] ABSTRACT

This invention comprises an aqueous size composition comprising polyvinylacetate and 3-chloropropyl trimethoxysilane. Additionally, the size will comprise a film former and a neutralizer.

5 Claims, No Drawings

NON-AGING EPOXY COMPATIBLE SIZE

BACKGROUND OF THE INVENTION

This invention relates to non-aging epoxy compatible sizes.

In one of its more specific aspects, this invention relates to non-aging epoxy compatible sizes having improved storage properties.

It is conventional in the glass fiber producing industry to apply a size to the surface of the glass to improve its handling and processing characteristics. One frequently employed size is an epoxy compatible size, that is, a size designed to be compatible with epoxy resins with which the glass fibers are employed.

One of the more frequently employed sizes of this kind is a solvent-based size comprising diacetone alcohol. However, this size imparts strength to the glass upon application thereto only if kept refrigerated while in storage.

There has now been developed a size which is epoxy compatible and which does not require refrigerated storage to prevent loss of strength-imparting qualities when applied to the glass fibers.

The size can be employed with both E-glass (optimum characteristics for electrical applications) and S-glass (high strength glass) as well as glass employed in filament winding and all other glass strands. When so applied, the size gives fast and complete wet-out, imparts high shear and tensile strengths in epoxy composites, is low cost and can be applied from an aqueous media. The size is mixed and applied in the conventional manner.

STATEMENT OF THE INVENTION

This invention comprises an aqueous size composition comprising polyvinylacetate and 3-chloropropyl trimethoxysilane. Additionally, the size will comprise a lubricant, a film former, and a neutralizer.

This invention further comprises glass strands having in contact with their surfaces the residue formed by removing water from an aqueous composition comprising polyvinylacetate and 3-chloropropyl trimethoxysilane. Additionally, the composition will comprise a lubricant, a film former and a neutralizer.

In one of its preferred embodiments, the aqueous composition will be comprised, approximately, on a weight percent basis, of:

| | |
|---|---|
| Polyvinylacetate (principal film former | 3.0 to 7.0 |
| 3-Chloropropyl trimethoxysilane | 0.1 to 0.5 |
| Lubricant | 0.7 to 1.5 |
| Film Former | 0.5 to 1.5 |
| Neutralizer | 2.0 to 5 pH |

In a preferred embodiment of the invention, the aqueous composition will be comprised, approximately, on a weight percent basis, of:

| | |
|---|---|
| Polyvinylacetate | 5.0[1] |
| 3-Chloropropyl trimethoxysilane | 0.2 |
| Lubricant | 1.125 |
| Film Former | 0.84[2] |
| Neutralizer | 0.2 |

[1] Based on National Starch's 25-1048, as received.
[2] Based on PVP-K-90 by GAF Corp. (22.5% solids)

Any suitable polyvinylacetate can be employed. Preferably, there will be employed National Starch's PVAC 25-1048 in an "as received" condition, in which the above compositions are expressed, in which condition it is a polyvinylacetate homopolymer, colloidally stabilized with polyvinyl alcohol, containing no surfactant, but containing 3% dibutyl phthalate as a plasticizer. It is non-ionic, possesses 80% stability in styrene and has a particle size of about 1μ. It is approximately 45-52% solids as received.

Any suitable lubricant, or mixture of lubricants, can be employed. Preferable is Twitchell 7440 as produced by Emery Industries. It is a non-ionic sulfonated mineral oil.

Any suitable film former or mixture thereof can be employed. Preferable is polyvinylpyrollidone PVP-K-90 (22.5% solids) as available from GAF Corporation. It is a water-soluble polymer having an average molecular weight of about 360,000.

Any suitable neutralizer can be used. As is frequently the case, acetic acid is preferred.

The size of this invention is easily prepared. Approximately one-half of the total amount of deionized water is charged to a main mix tank and agitation is begun. The 3-chloropropyl trimethoxysilane is introduced into the main mix tank and the composite is agitated for thirty minutes.

The quantity of polyvinylacetate to be employed is then mixed with about an equal volume of water and the combination is introduced into the main mix tank.

A premix is formed of the lubricant and the film former, an equal volume of water is added thereto and, after mixing, the composite is introduced into the main mix tank. The composite is then diluted with the balance of the distilled water to be used and its pH is adjusted to about 3.5 by the addition of acetic acid.

EXAMPLE I

For comparative purposes, a series of formulations was prepared, only one of the series, Formulation C, being in accordance with the invention in that it contained both polyvinylacetate and 3-chloropropyl trimethoxysilane. These formulations were as follows, all compositions being expressed in weight percent.

| Formulation Ingredients* | A | B | C (inv) | D | E |
|---|---|---|---|---|---|
| PVAC-25-1048 | 5.0 | 5.0 | 5.0 | 0.0 | 5.0 |
| A-1100 silane | 0.2 | 0.0 | 0.0 | 0.2 | 0.0 |
| Twitchell 7440 | 1.125 | 1.125 | 1.125 | 1.125 | 1.125 |
| A-163 silane | 0.0 | 0.0 | 0.0 | 0.0 | 0.26 |
| PVP-K-90 | 0.84 | 0.84 | 0.84 | 0.84 | 0.84 |
| Z-6040 silane | 0.0 | 0.20 | 0.0 | 0.0 | 0.0 |
| PVAC-2828 | 0.0 | 0.0 | 0.0 | 5.0 | 0.0 |
| 3-CPTMS | 0.0 | 0.0 | 0.2 | 0.0 | 0.0 |
| HOAC | 0.20 | 0.20 | 0.20 | 0.20 | 0.20 |
| Dei. H2O | To 100 | To 100 | To 100 | To 100 | To 100 |
| Total | 100 | 100 | 100 | 100 | 100 |
| Mix Solids | 4.05 | 4.09 | 4.07 | 3.90 | 3.77 |
| pH | 4.3 | 3.5 | 3.5 | 4.2 | 4.3 |

*As Received basis using material specified
**Ingredients as follows:

| | |
|---|---|
| PVAC-25-1048 | Polyvinylacetate |
| A-1100 | g-aminopropyl triethoxysilane |
| A-163 | methyl trimethoxysilane |
| Twitchell 7440 | lubricant |
| PVP-K-90 | polyvinylpyrrolidone |
| Z-6040 | trimethoxy silane |
| PVAC-2828 | Polyvinylacetate |
| 3-CPTMS | 3-chloropropyltrimethoxysilane |
| HOAC | acetic acid |

-continued

| Formulation Ingredients* | A | B | C (inv) | D | E |
|---|---|---|---|---|---|
| Dei. H$_2$O | | | deionized water | | |

The above formulations were individually applied to E-glass fibers, which fibers were then formed into rovings which were tested as follows:

| Formulation | A | B | C (inv) | D | E |
|---|---|---|---|---|---|
| % LOI | 0.84 | 0.88 | 0.82 | 0.88 | 0.82 |
| Yards/# | 7890 | 7822 | 7938 | 7905 | 7996 |
| NOL Shear, as Rec'd.** | 9025 | 9039 | 10718 | 6662 | 7351 |
| NOL Shear, 72 Hr. Boil** | 7665 | 6087 | 9690 | 4797 | 6280 |
| % Wet Ret. | 84.9 | 67.3 | 90.4 | 72.0 | 85.4 |
| % Resin Cont. | 22.1 | 23.4 | 25.1 | 22.3 | 21.8 |
| LOI | = Loss on Ignition | | | | |
| NOL | = Naval Ordinance Lab. Shear Ring Test | | | | |
| 72 Hr. Boil | = 72 Hour boil test | | | | |
| % Wet Ret. | = Percent wet retention | | | | |
| % Resin Cont. | = Percent resin content | | | | |

**Average of 7 values

The above data demonstrate the unexpected physical improvements which are imparted to E-Glass strands in respect to shear when employing composition C, the composition of the invention containing, in combination, polyvinylacetate and 3-chloropropyl trimethoxysilane.

EXAMPLE II

For additional comparative purposes, a second series of formulations was prepared, Formulation F, being in accordance with the invention in that it contained both polyvinylacetate and 3-chloropropyl trimethoxysilane. These formulations were as follows, all compositions being expressed in weight percent.

| Formulation Ingredient* | A | B | C | D | E | F (inv) |
|---|---|---|---|---|---|---|
| AD501 | 4.91 | 4.91 | 4.91 | 5.00 | 4.91 | 0.0 |
| A-1100 silane | 0.0 | 0.16 | 0.0 | 0.40 | 0.24 | 0.0 |
| A-163 silane | 0.0 | 0.24 | 0.0 | 0.60 | 0.0 | 0.0 |
| Z-6040 silane | 0.160 | 0.0 | 0.0 | 0.0 | 0.0 | 0.0 |
| 3-CPTMS | 0.0 | 0.0 | 0.30 | 0.0 | 0.0 | 0.20 |
| Twitchell 7440 | 1.125 | 1.125 | 1.125 | 1.125 | 1.125 | 1.125 |
| PVP-K-90 | 0.840 | 0.840 | 0.840 | 0.840 | 0.840 | 0.840 |
| Acetic Acid | 0.20 | 0.20 | 0.20 | 0.20 | 0.20 | 0.20 |
| PVAC-25-1048 | 0.0 | 0.0 | 0.0 | 0.0 | 0.0 | 5.0 |
| Dei. H$_2$O | To 100 | To 100 | To 100 | To 100 | To 100 | To 100 |
| Total | 100 | 100 | 100 | 100 | 100 | 100 |

| Formulation Ingredient* | A | B | C | D | E | F (inv) |
|---|---|---|---|---|---|---|
| Mix Solids | 6.36 | 6.43 | 6.12 | 6.50 | 6.04 | 3.87 |

*Ingredients
AD 501 - Epoxy emulsion by Owens-Corning Fiberglas.

The above formulations were individually applied to S-glass fibers, which fibers were then formed into rovings which were tested as follows:

| Formulation | A | B | C | D | E | F (inv) |
|---|---|---|---|---|---|---|
| % LOI | 0.91 | 0.83 | 0.83 | 0.91 | 0.88 | 0.87 |
| Grams/yd | 0.608 | 0.622 | 0.607 | 0.620 | 0.606 | 0.605 |
| NOL Shear, as Rec'd. | 10773 | 11253 | 9920 | 10596 | 9537 | 11696 |
| NOL Shear, 72 Hr. boil | 9132 | 10616 | 8677 | 10178 | 8873 | 10287 |
| % Wet Ret. | 84.8 | 94.3 | 87.5 | 96.1 | 93.0 | 88.0 |
| % Resin Cont. | 21.1 | 21.6 | 20.8 | 24.2 | 21.7 | 24.5 |
| Tensile psig × 10$^3$ | 565 | 556 | 565 | 518 | 537 | 572 |

The above data demonstrate the unexpected physical improvements which are imparted to S-glass strands in respect to both shear and tensile when employing composition F, the composition of the invention containing, in combination, polyvinylacetate and 3-chloropropyl trimethoxysilane.

It will be evident from the foregoing that various modifications can be made to this invention. Such, however, are considered within the scope of the invention.

We claim:

1. An aqueous-based size for glass fibers comprising polyvinylacetate and 3-chloropropyl trimethoxysilane.

2. The size of claim 1 comprising a lubricant, a film former and a neutralizer.

3. The size of claim 1 having the following approximate composition, in parts per 100 parts of the size:

| Polyvinylacetate | 3 to 7 |
|---|---|
| 3-chloropropyl trimethoxysilane | 0.1 to 0.5 |

4. The size of claim 2 having the following approximate composition in weight percent:

| Polyvinylacetate | 5.0 |
|---|---|
| 3-chloropropyl trimethoxysilane | 0.2 |
| Lubricant | 1.125 |
| Film Former | 0.84 |
| Neutralizer | 0.2 |

5. The size of claim 2 in which said lubricant is a sulfonated mineral oil, said film former is polyvinylpyrollidone and said neutralizer is acetic acid.

* * * * *